April 17, 1945.  K. J. KRAUS  2,374,105
WEIGHT ANALYZER
Filed Nov. 5, 1942  3 Sheets-Sheet 1
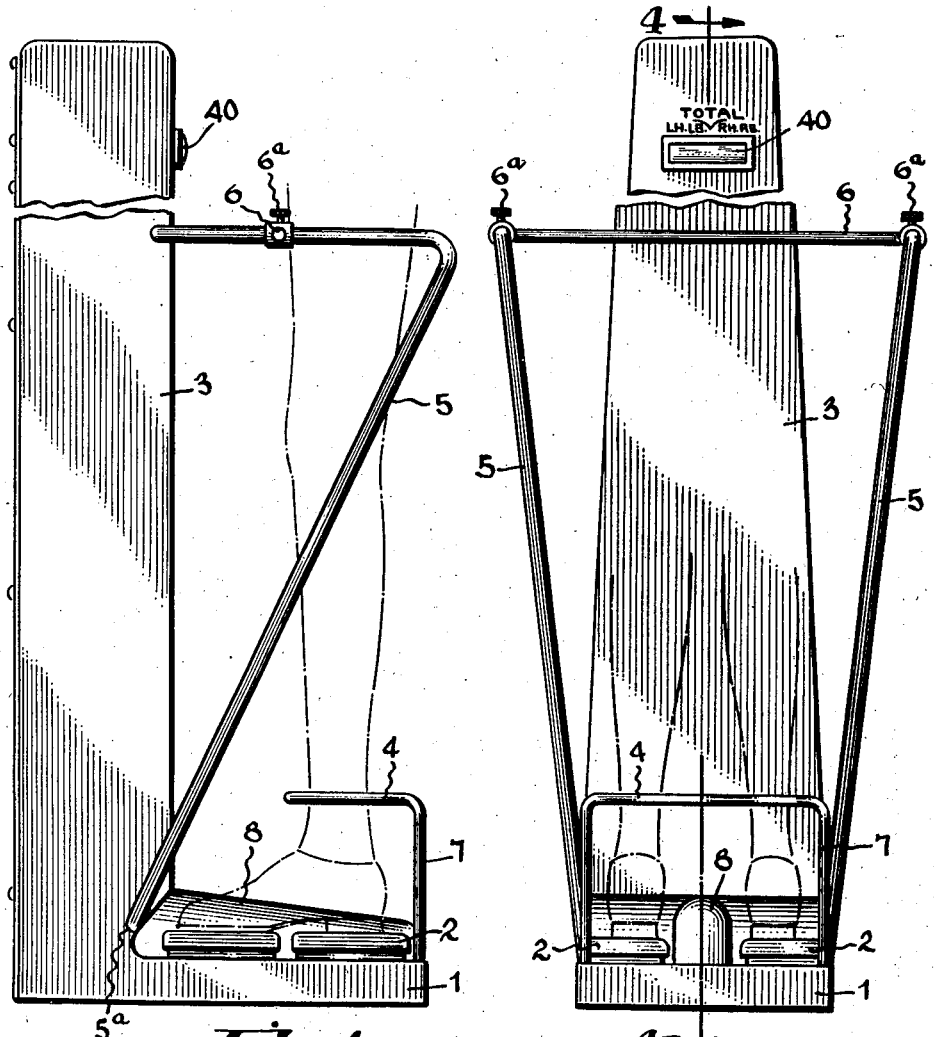
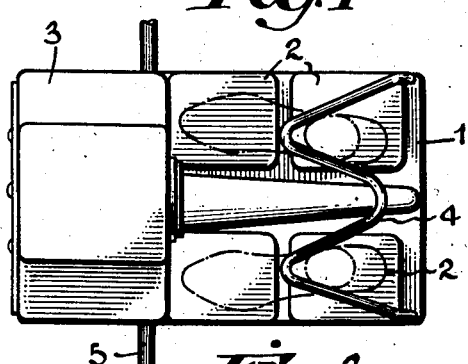
INVENTOR.
Karl J. Kraus
BY William A. Wilken
AGENT April 17, 1945.    K. J. KRAUS    2,374,105
WEIGHT ANALYZER
Filed Nov. 5, 1942    3 Sheets-Sheet 2

INVENTOR.
BY Karl J. Kraus
William A. Wilken
AGENT

April 17, 1945.　　　K. J. KRAUS　　　2,374,105
WEIGHT ANALYZER
Filed Nov. 5, 1942　　　3 Sheets-Sheet 3

INVENTOR.
Karl J. Kraus
BY William A. Wilken
AGENT

Patented Apr. 17, 1945

2,374,105

UNITED STATES PATENT OFFICE 2,374,105

WEIGHT ANALYZER

Karl J. Kraus, Mobile, Ala.

Application November 5, 1942, Serial No. 464,695

7 Claims. (Cl. 73—172)

This invention relates to weighing apparatus and method for the detection and diagnosis, by weight measurement, of abnormalities or deformities in the human physique, especially as affecting the posture and sense of balance.

More particularly the invention is directed to a weighing scale having a plurality of weight-bearing platforms and respective indicating dials for registering individually the weight carried by the ball and heel of each foot, as well as the total weight of a person standing upon the platforms.

The apparatus is designed primarily for use by physicians in detecting hidden deformities in bone structure, abnormal habits of posture, organic disorders and testing the sense of balance.

Briefly it is the concept of the invention to provide apparatus to sustain the body either in a stabilized guided standing position or in unstabilized free standing position upon four weight indicating platforms coinciding with the ball and heel of each foot for determining the weight carried by each part. By indicating the weight distribution in a stabilized and guided standing position, the instrument indicates either a normal or abnormal posture; and utilized in a free standing or unstabilized manner the instrument serves as an indicator of the sense of balance.

As an instrument for gauging the sense of balance or equilibrium, the apparatus records or registers the character and degree of fluctuation of weight distribution of the subject standing upon the platforms. As such it provides an accurate gauge permitting a scientific measurement of the sense of equilibrium otherwise difficult to ascertain. Such tests are of value in examining prospective flyers, testing for intoxication and in the field of medicine for general diagnosis.

Various disorders, pain and distress may be traced to abnormal posture conditions, the location of the pain often being remote from the condition causing it, thus presenting a difficult problem of diagnosis. As an example a patient may unknowingly have one leg slightly shorter than the other and complain of pain in the region of the stomach by reason of distortion of the pelvic structure. Ordinary methods would fail to disclose this condition unless the physician happened to take measurements.

By using the present apparatus the condition is indicated and the physician enabled to prescribe the proper remedy such as orthopedic shoes, having raised sole or heel as the case may require.

The scale is preferably utilized in conjunction with standardization charts indicating the weight distribution of normal persons of given weight in order to guide the operator in detecting abnormalities and to indicate the degree thereof.

In order to more accurately determine the weight distribution the scale is provided with fixtures for positioning the body in a correct normal posture. Any abnormality will then register on the indicators because the body will be thrown off balance and even weight distribution disturbed, whereas if normal, the weight distribution will not be disturbed.

When used in conjunction with weight distribution charts and positioning fixtures, the apparatus may be operated by lay persons or by a doctor's assistant or nurse.

The apparatus is adaptable for testing the sense of balance by eliminating the positioning fixtures so that the person upon the platform stands free. One instance of such use is in the preliminary examination of prospective flyers. The candidate is caused to stand upon the scale platforms preferably blindfolded. His efforts to retain his balance will register upon indicating dials; persons with a fine sense of balance thus show relatively slight fluctuations, while those less gifted show greater fluctuations. The amplitude of the fluctuations or variations furnishes a reliable index of the fitness of the candidate as to the sense of balance, otherwise difficult to determine with any degree of accuracy.

It is therefore an object of the invention to provide a device for indicating abnormal body or posture conditions by measuring the weight distribution of the feet while the body is maintained in a condition of correct normal posture in a stabilized standing position.

It is another object to provide a device for detecting abnormal body conditions by the provision of weight distribution and total weight indicating mechanism for comparison with predetermined normal readings to indicate the location and degree of disorders.

It is still another object of the invention to provide a weight distribution indicating device, capable of quickly and accurately registering irregularities of posture or physical structure, permitting a rapid and comprehensive examination of the physique.

It is a further object to provide a weight distribution scale having positioning fixtures which serve to maintain a symmetrical standing posture and stabilize the person being examined.

It is a further object to provide a device for determining and measuring the inherent sense of balance or equilibrium of persons by the provision of weight indicating dials capable of registering variations in weight distribution as the person maintains equilibrium in a free standing position.

Further objects and advantages of the invention will be more fully set forth in the description of the drawings illustrating a preferred embodiment of the invention.

Figure 1 is a side elevation of the weight distribution scale showing in dot and dash lines the legs of a person in place on the platform.

Figure 2 is a front elevation of the same.

Figure 3 is a top plan view of the scale illustrating the position of the feet in dot and dash lines with respect to the platforms.

Figures 4, 5:
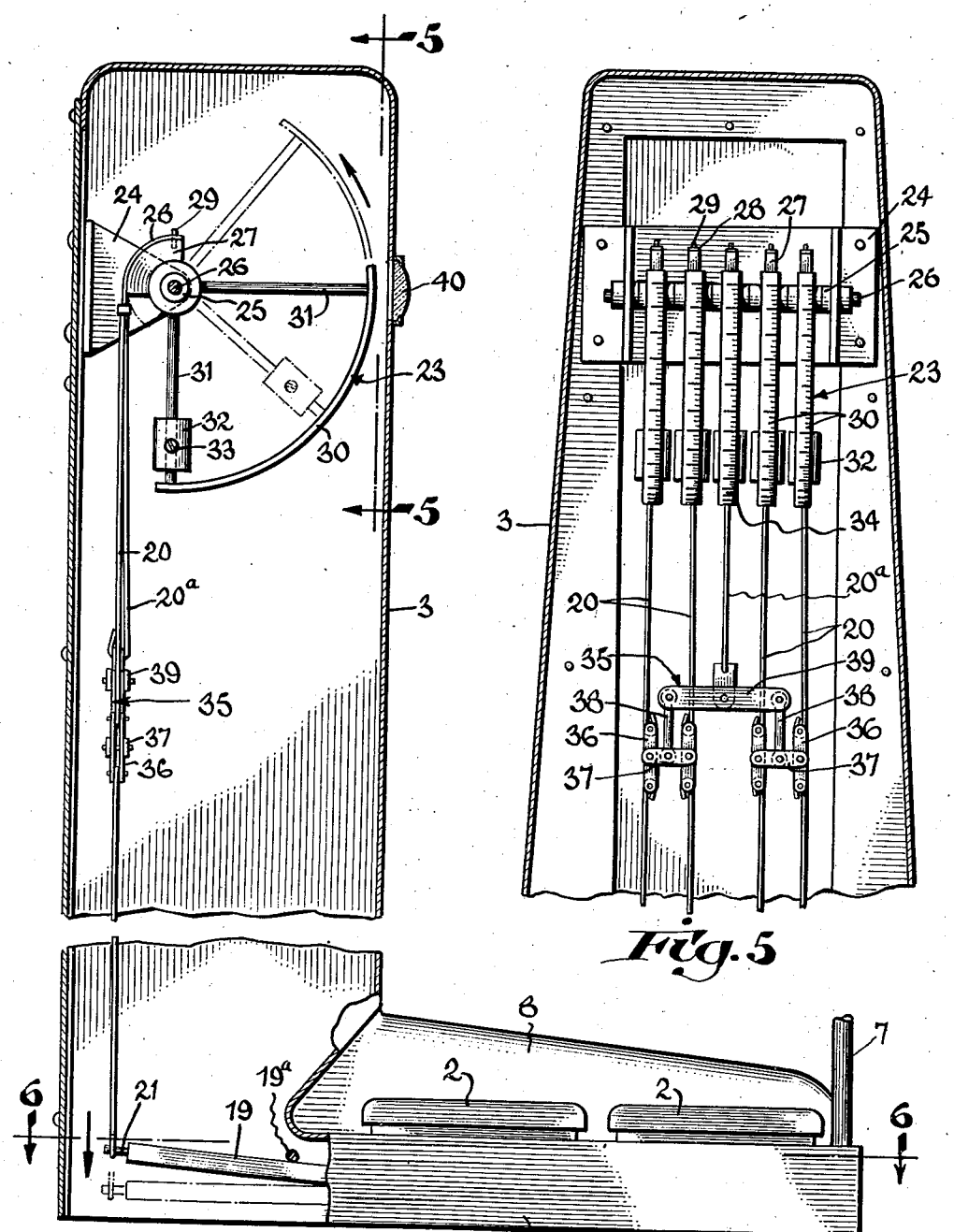
Figure 4 is an enlarged fragmentary side view of the scale partially in section illustrating the weight indicating mechanism.
Figure 5 is a sectional view taken on line 5—5 Figure 4, further illustrating the indicating mechanism and the lever arrangement for actuating the total weight indicating dial.
Figure 6:
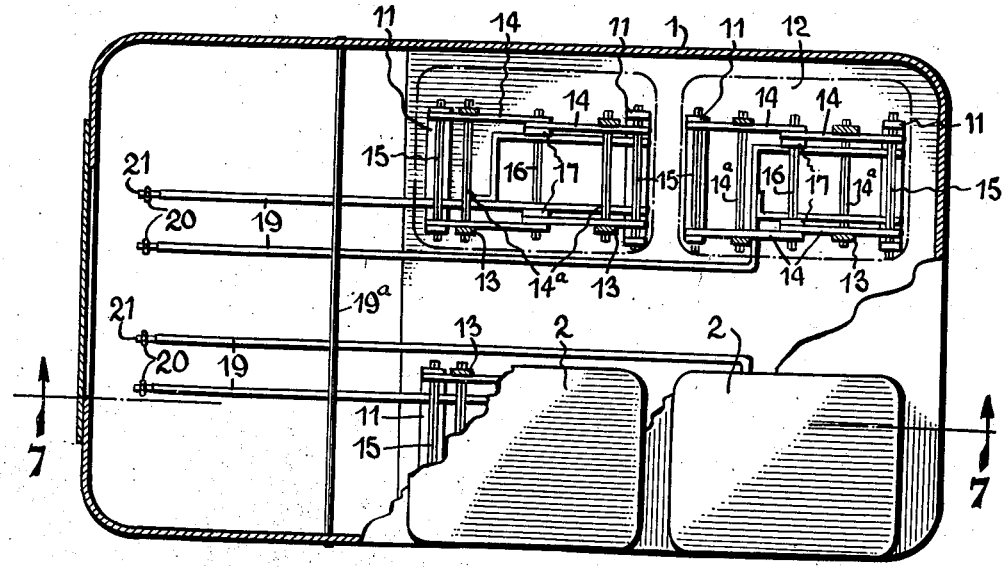
Figure 6 is a sectional view taken on line 6—6 Figure 4, illustrating the weight sustaining platform and lever arrangement.
Figure 7:
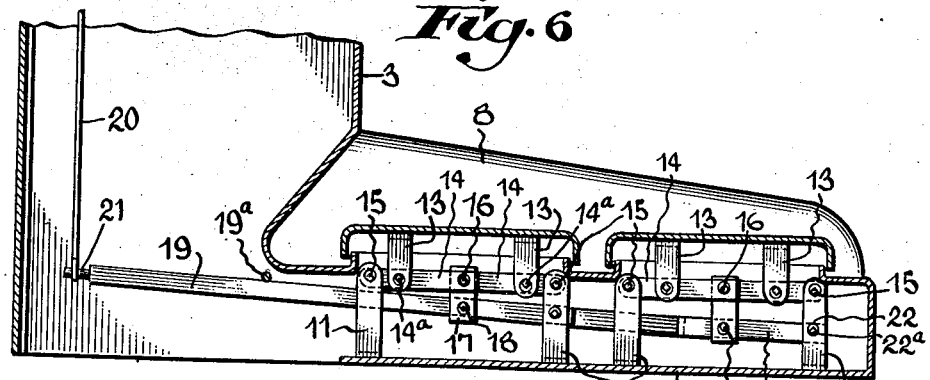
Figure 7 is a sectional view taken on line 7—7, Figure 6, further illustrating the scale platforms.

Referring specifically to the drawings especially to Figures 1, 2 and 3, the weight distribution scale as illustrated in general comprises a base 1, having a set of four scale platforms 2, mounted thereon for engaging respectively the ball and heel of each foot. These platforms are appropriately poised upon a system of fulcrumed levers which in turn connect to respective reading dials mounted at the upper portion of a vertical standard 3, extending from the base 1. The standard is preferably of a height to dispose the dials approximately at the eye level of the average person for convenience in reading the dials.

In the present instance the dials are shown facing the person on the scale platform. However, it is contemplated in some instances to arrange them to face the opposite side of the standard for the convenience of the person making the tests.

The base 1 and standard 3 may be fabricated of sheet metal for lightness, or may follow any commercial practice, since the detailed structure of these parts is not essential to the present invention.

The organization includes a set of fixtures for appropriately positioning the body in approximately correct posture. These fixtures comprise a guide bracket 4, mounted upon the base, for positioning the feet correctly; a pair of side rails 5—5 appropriately spaced to receive the body therebetween and maintain a correct vertical position transversely, and a horizontal cross rail or spacer 6, mounted on the side rails, to maintain the posture correctly in forward and rearward or longitudinal direction. The side rails 5—5 serve also as hand rails, and if desired, they may be arranged for widthwise adjustment to permit the spacing to be varied to suit various persons. This is accomplished by the set screws 6a which clamp the rails 5 to the cross rail 6, the rails 5 being hingedly mounted at the base as at 5a for this purpose.

The guide bracket 4 for the feet comprises a rail, preferably of one piece and bent generally in the shape of an M, providing a pair of spaced converging or V shaped rails for engaging the legs just above the ankles and centering the feet upon the platforms with the balls and heels resting upon the respective platforms. (See Figure 3.) The wedging action of the V shaped bends serves to center or gauge the legs laterally as well as to dispose the feet inwardly the proper distance for accurate weighing. It will be noted that the V bends permit the thinner legs of a smaller person or child to move inwardly further than those of the larger, in order to position the relatively smaller feet at approximately the same relative position upon the platform as the larger. This avoids the possibility of the weight being concentrated upon the forward or heel-bearing platforms with a consequent inaccurate weight distribution reading.

The guide bracket 4 includes a pair of vertical standards 7—7 as a part thereof. The standards are of a length to dispose the gauge portion at an appropriate distance above the platforms. The lower ends of the extensions or standards may be secured to the base 1 of the scale in any well known manner.

A separator 8 is located longitudinally between the right and left sets of platforms and is secured to the base 1. The separator is in the form of a rib, generally semi-circular in cross section, and tapered longitudinally with its widest portion inwardly or toward the vertical standard 3 of the scale. The separator is designed to lie between the feet with the wide portion between the balls of the feet causing the feet to be positioned in a natural position with the toes pointing slightly outwardly.

The separator 8 is preferably formed of a sheet metal stamping and the guide bracket 4 and side rails 5, preferably of tubular stock. Since these fixtures come into contact with the clothing, it is desirable that they be give a smooth finish such as by plating and buffing.

The combination of fixtures gauge the person upon the scale, causing him to assume an erect posture with the feet spaced and disposed in a natural manner and properly located upon the platforms. This aids in effecting an accurate scale reading. Since a normal person standing erect will carry his weight proportionately distributed within known limits, the guide fixtures reduce possible deviation and error by inducing an erect posture. Should the person have some structural or habitual abnormality, the guide fixtures, by inducing a normal erect posture, cause a disarrangement of the weight distribution with consequent registration on the scale.

Ordinarily a person having some structural or habitual posture abnormality distorts his body in a direction or manner necessary to approximately maintain a balanced distribution. For example, a person with one leg slightly shorter may twist slightly the hips or trunk to compensate. Normally he will maintain a fairly even distribution of weight. The guide fixtures by inducing a symmetrical erect posture produce a disarrangement in distribution with consequent registration on the scales. In other words, the trunk of the body will be shifted toward center causing more weight to be carried on the longer leg.

The fixtures additionally serve to stabilize the body and help maintain the equilibrium. This prevents excessive variations in the readings because in maintaining balance in a standing position, the weight is shifted about instinctively, unless some means are provided to prevent this.

Referring to Figures 4 to 8 of the drawings illustrating the weighing apparatus, the scale platforms 2 mounted upon the base 1 of the scale are four in number and are properly located to engage the ball and heel of each foot. The platforms are preferably rectangular in shape and formed of sheet metal stampings. Each of the platforms is independently poised, being supported upon a pair of U shaped brackets 11, secured upon the bottom 12 of the base 1. The construction of the several platforms being identical, a description of one of them is sufficient.

Each scale platform includes a pair of duplicate U shaped brackets 13, secured to its underside, the brackets depending downwardly with their lower ends lying adjacent to the upper ends of the brackets 11. A set of four levers 14 supports the platform, each lever having its outer end pivoted or fulcrumed upon one of the upper ends of the brackets 11 as at 15. The scale platform brackets 13, make a pivotal connection to the respective levers 14 alongside the fulcrum point 15 as at 14a and thus support the platform at opposite ends upon the set of levers.

The inward free ends of the levers 14 meet at a common center and are pivotally joined as at 16 to a link 17, one for each side of the platform. The lower opposite end of the link 17 pivoted as at 18 to an actuating beam 19, which in turn is fulcrumed at one end upon one of the U shaped support brackets 11. The opposite free end of the beam 19 makes a connection to one of the reading scales by means of a connecting rod or wire 20, hooked to a pin 21, at the end of the beam.

The several pivot points connecting the lever arrangement are preferably made by means of rods 22 of square cross section. The rods are turned so that their corners are presented to the bearing apertures 22a, thereby constituting a knife edge support to reduce friction to a minimum.

The lever arrangement transmits the forces applied to the platform to the link 17, which is common to the four levers and which in turn transmits the force to the beam 19. Since the platform is supported at opposite ends upon the levers 14, the levers serve to equalize movement of the platform; in other words all four levers move simultaneously, being connected in common. This prevents tipping of the platform and insures an accurate weight indication independent of its point of application on the platform so that the platforms are adaptable to various shoe sizes with accurate results.

It will be noted that the actuating beams 19 for the forward or heel platforms are considerably longer than the beams connecting the rearward or ball platforms. In order to compensate for this difference in leverage, the platform brackets 13, for the forward platforms are set closer together, thereby increasing the leverage of the set of connecting levers 14 sufficiently to compensate for the decrease in leverage of the longer beams. The movement of the four beams at their inner or free ends is therefore the same for all four for a given degree of movement of their respective platforms. However, if desired, the platform connections could be made identical for all four platforms and the leverage compensation made by varying the leverage at the point of connection to the indicating dials.

In order to prevent excessive oscillation of the indicating dials when the weight is removed from the scale, a stop is provided, preferably in the form of a cross rod 19a, extending across the base and disposed above the four beams 19. The rod holds the beams in a common plane and facilitates setting up or adjusting and maintaining the indicating dials at a zero setting. The rod may be provided with shock absorbing means such as rubber washers or the like if desired.

The scale in the present instance is of the counterweight type, as illustrated. The reading dials generally indicated at 23 are located in the upper portion of the scale standard 3, supported on a bracket 24 and preferably journalled on antifriction bearings. The dials are five in number, one respectively for each of the four platforms and a fifth dial indicating the total weight.

Each dial comprises a hub 25, journalled upon a shaft 26 carried by the bracket 24. The rear portion of the hub includes an arcuate sector element 27, upon which is disposed a flexible ribbon 28, preferably of metal, the upper end of which is anchored to the sector by means of a pin 29. The ribbon lies upon the periphery of the sector and its lower end makes connection with the upper end of aforesaid connecting rod or wire 20, of the actuating beam (see Figure 4).

The reading scale or dial 30 is carried by the hub 25 and comprises an arcuate sector or rim in the present instance, extending approximately 90° about the axis of the hub. The outer or reading face of the rim is graduated in pounds, preferably from 0 to 75. The rim is secured to the hub by a pair of spokes or rods 31, the lower of which carries a counter weight 32, slidably mounted thereon. The counterweight includes a set screw 33, which permits the necessary adjustment of the counter weights in setting up the scale.

When a load is placed upon the platforms, the actuating beams swing downwardly, causing the reading dial to revolve upon its axis, thereby swinging the counterweight in an arc upwardly, as shown in dot dash lines Figure 4. The arcuate sector elements 27, provide for a constant ratio between movement of the beam 19 and movement of the graduated indicating rim, this together with the progressive increase in counter weight effect as the dial swings upwardly, permits a uniform or linear spacing of the graduations on the reading face of the rim and provides an accurate direct acting arrangement.

In order to actuate the total weight reading dial or scale 34, a compound lever equalizing arrangement, indicated generally at 35, is utilized. (See Figures 4 and 5.) Described in detail the equalizer or totalizer comprises a series of four connecting links 36, one for each of the connecting rods 20, the links connected at opposite ends to the rods 20 and forming a section thereof for movement with the rods. The links are connected in sets, two on each side by means of cross levers 37, each lever being pivotally connected at its opposite ends to a respective link. A pair of secondary connecting links 38—38 is provided, one being disposed between each pair of links 36, the lower end of each link being pivotally connected to the cross levers 37, at a point centrally thereof. The upper ends of the connecting links 38 make a pivotal connection to the opposite ends of a secondary cross lever 39, disposed above the cross levers 37. A pivotal connection is made at a point centrally of the secondary cross lever 39 to a fifth connecting rod 20a, the upper end of which is connected to the total weight indicating dial in the same manner as previously described for the reading dials 23.

The equalizer actuates the total weight dial by compounding the differential movements of the four connecting rods 20, swinging the total weight dial a degree equal to one-fourth the sum of movement of the four individual dials. The total dial is graduated in a ratio of four to one, with respect to the four individual dials, that is, assuming the graduations to be of equal spacing, each one-pound graduation of the individual dial is equal to a four-pound graduation on the total dial.

By way of illustrating the equalizer action, assume that a weight of one hundred pounds is concentrated on the right heel platform with no weight on the remaining three platforms. This would move the right hand connecting rod and dial a sufficient distance to register one hundred pounds, and no movement of the other three connecting rods and dials. This movement would be reduced one-half by the equalizer cross lever 37, and this degree of movement again reduced by half by the secondary cross lever 39, thus moving the intermediate connecting rod and total dial a distance of one-fourth the individual dial. Consequently both dials would register one hundred pounds because of the four to one ratio between the graduations of the two.

If the hundred pound weight were evenly distributed, twenty-five pounds on each of the four platforms, the equalizer would move the total dial the same linear distance as the four individual dials because there would be no differential in the four rod movements. In this case the total dial would again register one hundred pounds, because of the ratio of the graduations; the individual dials would of course register twenty-five pounds each. The above theoretical conditions are intended for illustration only; ordinarily all four rods and dials are actuated varying degrees, the equalizer swinging or indexing the total dial to a weight reading equal to the sum of the four individual dials.

If desired, the total dial may be graduated in a one to one ratio, with the individual dials, in which case its arc of swing would be increased proportionately. This could be accomplished by reducing the radius of the arcuate sector element 27 to one-four the radius of the others, thus increasing its swing to four times that of the individual dials.

Figure 8:
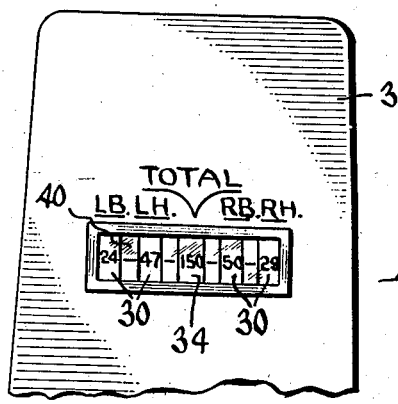
Figure 8 is an enlarged fragmentary view of the upper portion of the scale illustrating the reading face of the scale.

As shown in Figure 8 the five reading dials are arranged preferably with the totalizer located at the center intermediate of the right and left heel and ball dials. The reading face of the dials is viewed through an aperture in the scale standard, disposed either to the front or rear as the case may require. If desired a rectangular magnifying glass 40, may be placed in the aperture to facilitate reading the dials. Appropriate labels are disposed adjacent the respective dials to identify the readings, and a reference line is properly arranged for indexing the same.

The leverage between the respective scale platforms 2 and the beams 19 is substantially equal for all four platforms. For instance the leverage may be twenty to one, that is, a load of twenty pounds upon the platform imposes a one-pound load at the end of the beam 19, this ratio being equal for each platform and dial and causing each beam to swing downwardly a distance proportionate to the load on the platform.

The counterweights 32 on the respective indicating dials, being adjustable, is set to counterbalance its respective platform; therefore a given load upon one of the platforms exerts a proportionate pull upon the connecting rods or wires 20 and this force resisted by the counter weights, so that the calibrated dial registers the correct weight imposed upon the platform.

If desired, springs may be substituted for the counterweights, although it is generally accepted that a weight scale is more accurate than one actuated by springs.

As disclosed in the drawings and specifications, the mechanism represents a preferred embodiment of the invention. However, various modifications and alterations may be made as to the details of construction and operation without departing from the essence of the invention.

Having described my invention, I desire to be limited only by the following claims.

I claim:

1. An apparatus for indicating the weight distribution of the human body comprising: a plurality of counter balanced weight sustaining platforms for each foot respectively, a respective indicating device associated with each of said platforms for indicating the weight imposed thereon individually, and a total weight indicating device including a system of totalizing levers associated with all of said platforms in common and arranged to actuate said device for indicating the total weight imposed on said platforms collectively.

2. An apparatus for indicating the weight distribution and total weight of the human body in a standing position comprising: a plurality of counterbalanced weight sustaining platforms for each foot respectively, a respective weight indicating device connected to each of said platforms for indicating the weight imposed thereon individually, a plurality of totalizing levers connected to all of said platforms in common, and a counterbalanced total weight indicating device connected to said totalizing levers and adapted to indicate the total weight imposed upon the platforms collectively.

3. An apparatus for indicating abnormalities of structure or posture in the human body comprising: a plurality of scale platforms and respective weight indicating dials, said platforms arranged to receive the ball and heel of each foot respectively for indicating the weight imposed by each part, a gauge fixture disposed above said platforms at a height to engage the legs and locate the feet in a predetermined position relative to said platform said fixture comprising a pair of guides open at the front and converging towards the rear of said platform, and a second gauge fixture disposed above the first said fixture comprising a pair of side rails and a cross rail and adapted to engage the front and sides of the torso to maintain the body in a stabilized normal standing position upon said platforms.

4. An apparatus for indicating the weight distribution of the human body comprising: a plurality of vertically movable weight sustaining platforms, one for the ball and heel of each foot respectively, a counterbalance respectively associated with each of said platforms for sustaining the same against the weight imposed thereon, a respective indicating device associated with each of said platforms for indicating the weight imposed thereon individually, a counterbalanced total weight indicating device a plurality of totalizing levers connected in common with all of said platforms and connected to said total weight indicating device for indicating the total weight imposed thereon collectively, and body positioning fixtures associated with said platforms to locate the body in a predetermined position with respect to said platforms.

5. A weighing scale for clinical purposes comprising a base, and a pedestal, a plurality of counterbalanced scale platforms disposed upon said base, said platforms arranged to receive the ball and heel of each foot separately, respective reading dials, one for each of said platforms for indicating the weight imposed thereon, the reading dials mounted in said pedestal, respective connecting means between said scale platforms and the reading dials for actuating the same, a total weight reading dial mounted in said pedestal and a totalizing device, said device comprising a system of totalizing levers pivoted respectively to each of said connecting means for actuation thereby and pivoted to said total weight reading dial to actuate the same and indicate the sum total of said respective reading dials.

6. In an apparatus having a plurality of weight-sustaining platforms, respective indicating devices associated therewith for indicating the weight imposed on said platforms individually, and a total weight indicating device for indicating the total weight imposed on said platforms collectively, a totalizing device comprising; a plurality of totalizing levers, each lever having its respective opposite ends pivotally connected to a pair of said weight sustaining platforms and each of said levers pivotally connected centrally to a main totalizing lever at respective opposite ends thereof, said main lever pivotally connected centrally to said total weight indicating device to actuate the same.

7. In an apparatus having a plurality of counterbalanced weight-sustaining platforms, respective weight indicating devices associated with said platforms respectively for indicating the weight imposed thereon individually and a counterbalanced total weight indicating device for indicating the weight imposed on said platforms collectively, a totalizing device for actuating said total weight indicating device comprising; a plurality of beams, one of said beams pivotally suspended centrally from said total weight indicating device and having a pair of secondary beams pivotally suspended centrally from said beam at respective opposite ends thereof, said pair of secondary beams having their respective opposite ends pivotally connected respectively to said weight sustaining platforms for actuation thereby.

KARL J. KRAUS.